US006230320B1

(12) United States Patent
Gakumura

(10) Patent No.: US 6,230,320 B1
(45) Date of Patent: May 8, 2001

(54) TELEVISION RECEIVER EMPLOYING V CHIP SYSTEM AND METHOD OF TEMPORARILY RELEASING VIEWING RESTRICTION IN TELEVISION RECEIVER EMPLOYING V CHIP SYSTEM

(75) Inventor: Hiroki Gakumura, Kobe (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/427,188

(22) Filed: Oct. 26, 1999

(30) Foreign Application Priority Data

Oct. 28, 1998 (JP) .................................................. 10-307508

(51) Int. Cl.[7] ...................................................... H04N 7/16
(52) U.S. Cl. ................................................. 725/25; 725/28
(58) Field of Search ........................ 348/5.5, 10; 380/23; 725/25, 26, 28, 30

(56) References Cited

U.S. PATENT DOCUMENTS 5,485,518 * 1/1996 Hunter et al. ............................ 48/5.5
5,969,748 * 10/1999 Casement et al. ........................ 348/7
5,973,683 * 10/1999 Cragun et al. ......................... 348/5.5
5,978,920 * 11/1999 Lee ........................................ 713/202
5,995,133 * 11/1999 Kim ...................................... 348/5.5
5,995,160 * 11/1999 Rumreich ............................. 348/564
6,020,882 * 2/2000 Kinghorn et al. ..................... 348/5.5

* cited by examiner

Primary Examiner—Andrew Faile
Assistant Examiner—Hai V. Tran
(74) Attorney, Agent, or Firm—Armstrong, Westerman, Hattori, McLeland & Naughton, LLP

(57) ABSTRACT

A method of temporarily releasing viewing restriction in a television receiver employing a V chip system including the step of causing a user to enter a viewing restriction release command when the user desires to temporarily release viewing restriction based on the contents of a rating set such that a program having the rating is inhibited from being viewed, the step of making the viewing restriction based on the contents of the set rating invalid with the contents of the set rating held when the viewing restriction release command is entered, the step of causing the user to enter a viewing restriction return command when the user desires to return the viewing restriction, and the step of making the viewing restriction based on the contents of the set rating valid when the viewing restriction return command is entered.

4 Claims, 5 Drawing Sheets

```
┌─────────────────────────────────────────────────┐
│ ┌─────────────────────────────────────────────┐ │
│ │ V-GUIDE              ▷ OFF   ON            │ │
│ └─────────────────────────────────────────────┘ │
│                                                 │
│                                                 │
│   MPAA  Movie   Ratings                         │
│   TV  Parental  Guidelines                      │
│                                                 │
│                                                 │
│                                                 │
│                                                 │
│                                                 │
│   Use -/+ keys to switch off/on                 │
│   Press V-GUIDE key to exit                     │
│                                                 │
└─────────────────────────────────────────────────┘
```

TELEVISION RECEIVER EMPLOYING V CHIP SYSTEM AND METHOD OF TEMPORARILY RELEASING VIEWING RESTRICTION IN TELEVISION RECEIVER EMPLOYING V CHIP SYSTEM

BACKGROUND OF THE INVENTION

1. Field of the Invention

The present invention relates to a television receiver employing a V chip system and a method of temporarily releasing viewing restriction in the television receiver employing the V chip system.

2. Description of the Related Art

In the United States, a V chip system has been introduced in order to automatically make it impossible to view programs which parents do not desire their children to view. In Japan, the introduction of the V chip system is also being examined.

In the V chip system, ratings such as "violent" and "sexual" are respectively given to television programs, and the program to be broadcast as well as rating information relating to the program to be broadcast is sent out. Currently, the rating information is sent out utilizing a vertical blanking period of a video signal. On the other hand, a V chip for identifying ratings is incorporated into a television receiver, so as to make it automatically impossible to view programs respectively having ratings designated by the parents.

That is, the television receiver employing the V chip system is provided with means for identifying a rating on the basis of rating information sent with a program accompanied by the rating information, means for causing parents to set a rating such that a program having the rating is to be inhibited from being viewed by their children, and means for inhibiting the program having the rating set by the parents from being broadcast in addition to a normal television receiver.

The type of rating is defined by an MPAA (Motion Pictures Association of America) system and a TVPG (TV Parental Guidance) system which are defined by EIA (Electronic Industries Association) 744.

In the television receiver employing the V chip system, a person who has set a rating such that a program having the rating is inhibited from being viewed may, in some cases, temporarily release viewing restriction based on the contents of the set rating.

In order to release the viewing restriction based on the contents of the set rating, however, the contents of the set rating must be changed, which operation is troublesome. In order to return the contents of the set rating to the original state after the viewing restriction based on the contents of the set rating is released, the rating setting must be performed again, which operation is troublesome.

SUMMARY OF THE INVENTION

An object of the present invention is to provide a television receiver employing a V chip system which can release a viewing restriction based on the contents of a rating set such that a program having the rating is inhibited from being viewed without changing the contents of the set rating and can make the viewing restriction based on the contents of the set rating valid with the contents of the set rating at the time of releasing the viewing restriction maintained as it is, and a method of temporarily releasing viewing restriction in the television receiver employing a V chip system.

Another object of the present invention is to provide a television receiver employing a v chip system which can release viewing restriction based on the contents of a rating set such that a program having the rating is inhibited from being viewed without changing the contents of the set rating and can make, after the viewing restriction based on the contents of the set rating is released, the viewing restriction based on the contents of the set rating valid before releasing the viewing restriction by turning the power of the television receiver off, and a method of temporarily releasing viewing restriction in the television receiver employing a V chip system.

A method of temporarily releasing viewing restriction in a first television receiver employing a V chip system according to the present invention comprises the steps of causing a user to enter a viewing restriction release command when the user desires to temporarily release viewing restriction based on the contents of a rating set such that a program having the rating is inhibited from being viewed; making the viewing restriction based on the contents of the set rating invalid with the contents of the set rating held when the viewing restriction release command is entered; causing the user to enter a viewing restriction return command when the user desires to return the viewing restriction; and making the viewing restriction based on the contents of the set rating valid when the viewing restriction return command is entered.

A method of temporarily releasing viewing restriction in a second television receiver employing a V chip system according to the present invention is comprises the steps of causing a user to enter a viewing restriction release command when the user desires to temporarily release viewing restriction based on the contents of a rating set such that a program having the rating is inhibited from being viewed; making the viewing restriction based on the contents of the set rating invalid with the contents of the set rating held when the viewing restriction release command is entered; and making, in a case where the viewing restriction based on the contents of the set rating is invalid when a power-off command is entered, the viewing restriction based on the contents of the set rating valid, and then turning the power off.

A first television receiver employing a V chip system according to the present invention comprises entry means for entering a command to release viewing restriction based on the contents of a rating set such that a program having the rating is inhibited from being viewed without changing the contents of the set rating; means for making the viewing restriction based on the contents of the set rating with the contents of the set rating held when the command to release the viewing restriction based on the contents of the set rating is entered; entry means for entering a command to make the viewing restriction based on the contents of the set rating valid; and means for making the viewing restriction based on the contents of the set rating valid when the command to make the viewing restriction based on the contents of the set rating valid is entered after the viewing restriction is released.

A second television receiver employing a V chip system according to the present invention comprises entry means for entering a command to release viewing restriction based on the contents of a rating set such that a program having the rating is inhibited from being viewed without changing the contents of the set rating; means for making the viewing restriction based on the contents of the set rating invalid with the contents of the set rating held when the command to release the viewing restriction based on the contents of the set rating is entered; and means for making, in a case where the viewing restriction based on the contents of the set rating is invalid when a power-off command is entered, the viewing restriction based on the contents of the set rating valid, and then turning the power off.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
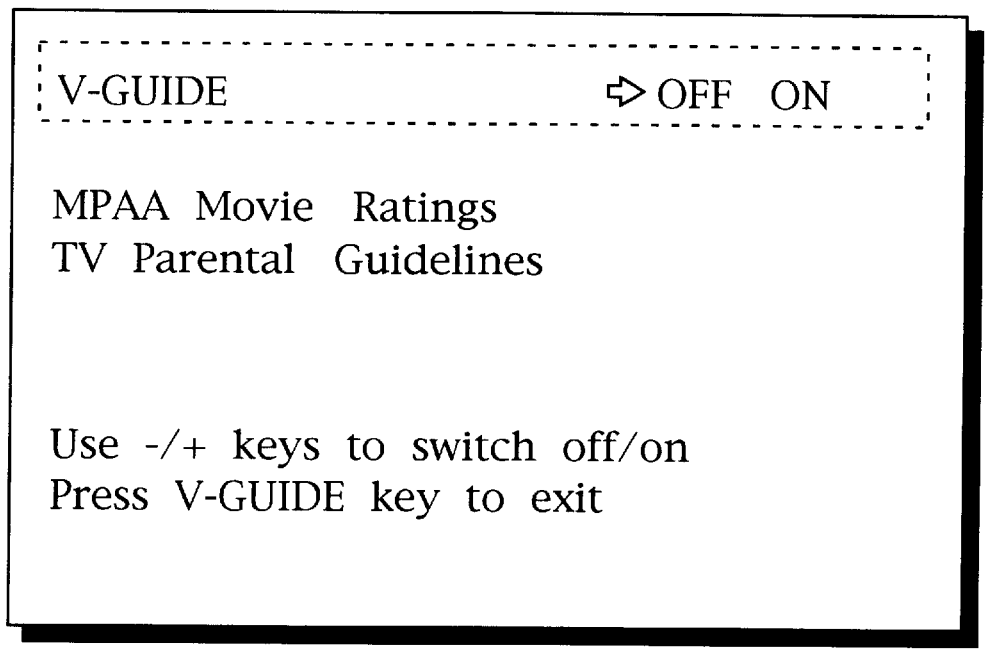
FIG. 1 is a schematic view showing an example of a menu screen for rating setting which is displayed when a V guide key (V-GUIDE key) is pushed.

Referring now to the drawings, an embodiment of the present invention will be described.

[1] Description of a Rating Setting Method

A remote controller for remotely operating a television receiver employing a V chip system is provided with the following keys in order to perform rating setting, for example:

(1) V guide key (V-GUIDE key)
(2) channel up key (CH▲key)
(3) channel down key (CH▼key)
(4) volume up key (VOL.+key)
(5) volume down key (VOL.−key)
(6) menu key (MENU key)

FIG. 1 illustrates an example of a menu screen for rating setting (hereinafter merely referred to as a menu screen) which is displayed when the V guide key (V-GUIDE key) is pushed.

The menu screen is provided, as selection items, with "V-GUIDE" for starting or releasing viewing restriction (hereinafter referred to as channel blocking) of a program having a rating set by rating setting, "MPAA Movie Ratings" for setting a rating defined by an MPAA system, and "TV Parental Guidelines" for setting a rating defined by a TVPG system. The description of operations is displayed in a lower part of the menu screen.

The items "V-GUIDE", "MPAA Movie Ratings" and "TV Parental Guidelines" are selected by the channel up key (CH▲key) or the channel down key (CH▼key)

When the V guide key (V-GUIDE key) is pushed in a case where the menu screen is displayed, the menu screen is erased.

Figure 2:
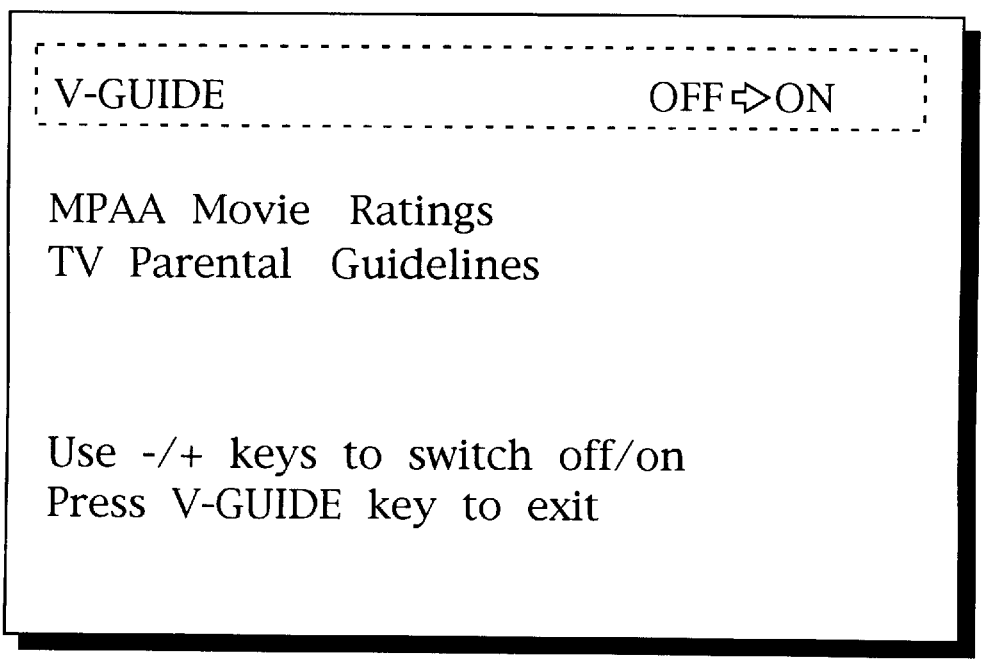
FIG. 2 is a schematic view showing a menu screen in a case where viewing restriction is made valid.

When the item "V-GUIDE" is selected by the channel up key (CH▲key) or the channel down key (CH▼key), characters "OFF" and "ON" are displayed beside the item "V-GUIDE". When the volume up key (VOL.+key) is pushed in this state, an arrow is displayed on the left side of "ON", as shown in FIG. 2. Accordingly, the viewing restriction (channel blocking) is started and the rating setting can be changed. That is the viewing restriction is made valid.

When the volume down key (VOL.−key) is pushed, an arrow is displayed on the left side of "OFF". Accordingly, the channel blocking is released. That is, the viewing restriction is made invalid.

Figure 3:
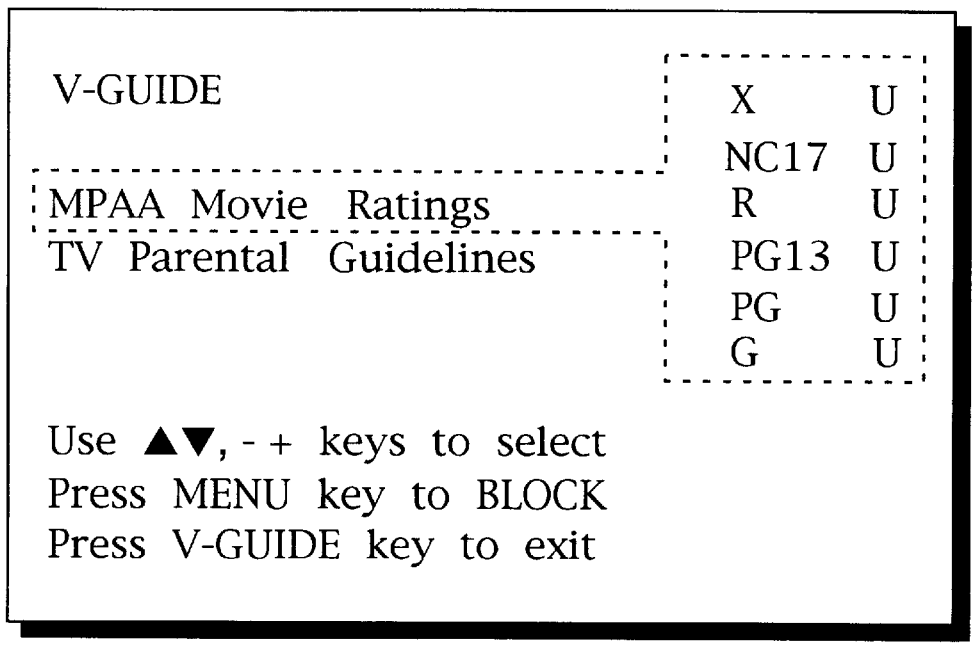
FIG. 3 is a schematic view showing an example of a setting screen "MPAA Movie Ratings"

When the item "MPAA Movie Ratings" is selected by the channel up key (CH▲key) or the channel down key (CH▼key) in a state where the viewing restriction is valid, a setting screen "MPAA Movie Ratings" is displayed, as shown in FIG. 3.

On the setting screen "MPAA Movie Ratings", six types of ratings "X", "NC17", "R","PG13", "PG" and "G"which are defined by MPAA are displayed as selection items. A character "U" displayed beside each of the ratings means that the rating is unblocked, that is, the rating is not set as such a rating that a program having the rating is to be inhibited from being viewed.

Figure 4:
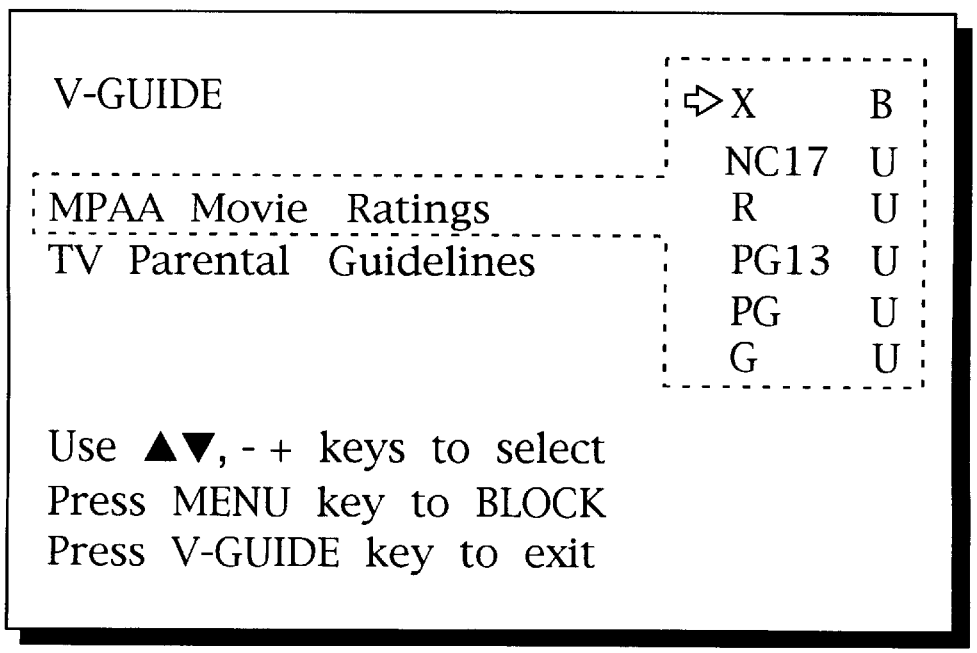
FIG. 4 is a schematic view showing a state where a rating "X" is blocked on the setting screen "MPAA Movie Ratings"

When the volume up key (VOL.+key) is pushed, the remote controller enters a mode for selecting a rating. When the menu key (MENU key) is pushed after such a rating that a program having the rating is to be inhibited from being viewed is selected by the channel up key (CH▲key) or the channel down key (CH▼key), therefore, the character "U" beside the rating is changed into "B". Accordingly, the rating is blocked, that is, the rating is set as such a rating that a program having the rating is to be inhibited from being viewed. For example, when the menu key (MENU key) is pushed after the rating "X" is selected, the character "U" beside the rating "X" is changed into "B", as shown in FIG. 4.

Figure 5:
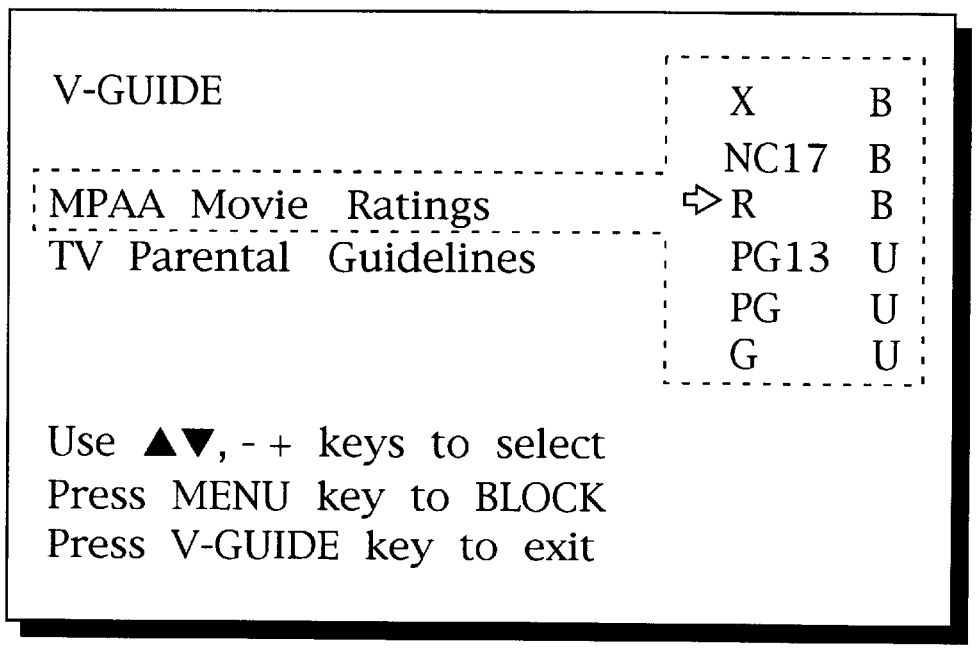
FIG. 5 is a schematic view showing that when a rating "R" is blocked on the setting screen "MPAA Movie Ratings", ratings "X" and "NC17" which are higher in order than the rating "R" are also automatically blocked.

When a low-order rating is blocked, a rating which is higher in order than the rating is automatically blocked. For example, when the rating "R" is blocked, the ratings "X" and "NC17" which are higher in order than the rating "R" are also automatically blocked, as shown in FIG. 5.

In order to release, with respect to the rating which has been blocked, the blocking of the rating (unblock the rating), the menu key (MENU key) may be pushed after the rating is selected. When a high-order rating is unblocked, a rating which is lower in order than the rating is automatically unblocked.

When the volume down key (VOL.−key) is pushed, the remote controller leaves the mode for selecting a rating. When the V guide key (V-GUIDE key) is pushed, the menu screen is erased.

Figure 6:
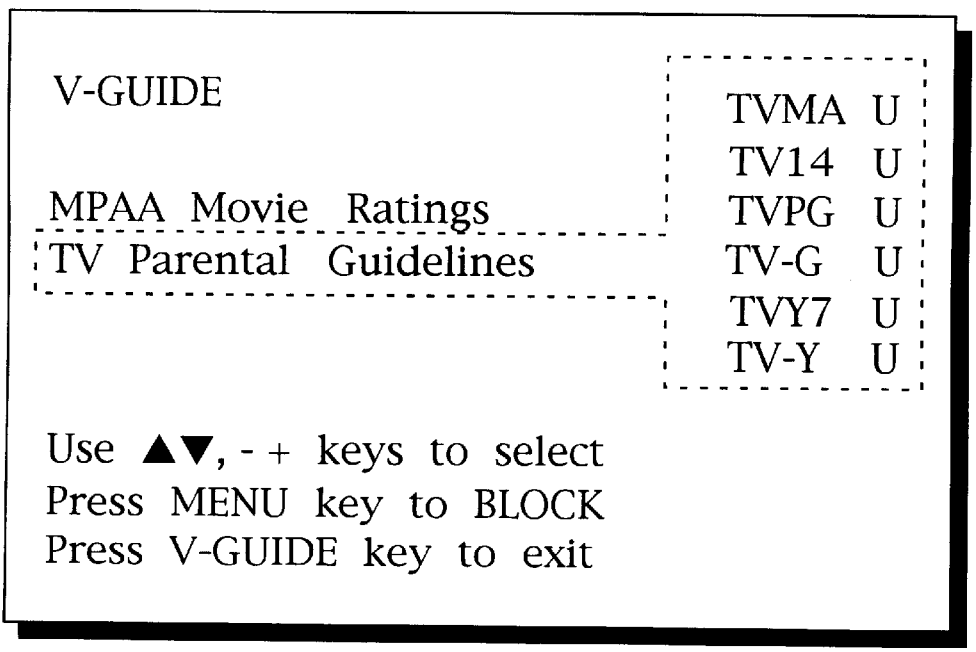
FIG. 6 is a schematic view showing an example of a setting screen "TV Parental Guidelines"

When the item "TV Parental Guide lines" is selected by the channel up key (CH▲key) or the channel down key (CH▼key) in a state where viewing restriction is valid, a setting screen "TV Parental Guidelines" is displayed, as shown in FIG. 6.

On the setting screen "TV Parental Guidelines", six types of ratings "TVMA", "TV14", "TVPG", "TV-G", "TVY7", and "TV-Y" which are defined by TVPG are displayed as selection items. A character "U" displayed beside each of the ratings means that the rating is unblocked, that is, the rating is not set as such a rating that a program having the rating is to be inhibited from being viewed.

Figure 7:
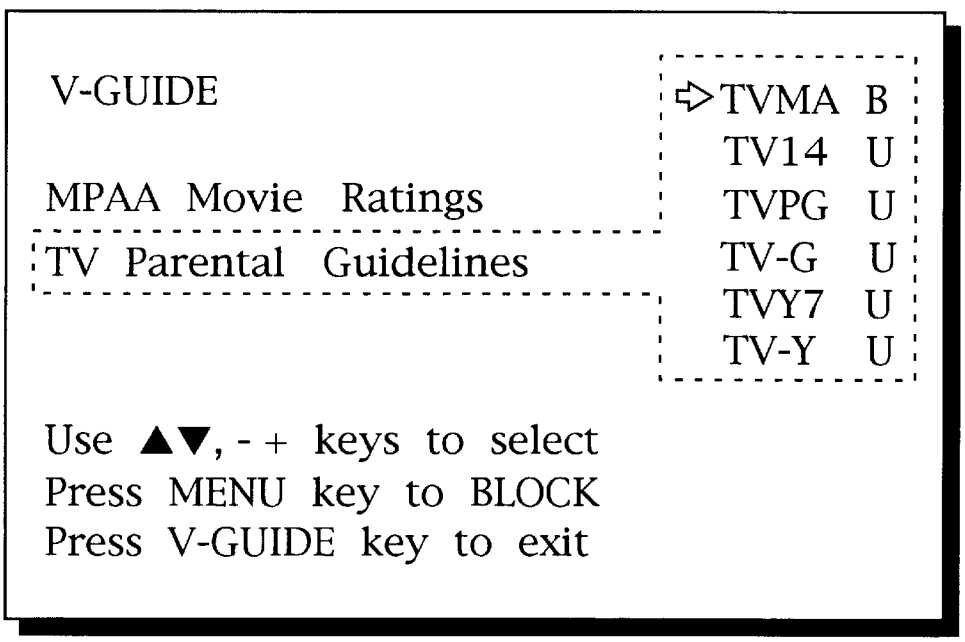
FIG. 7 is a schematic view showing a state where a rating "TVMA" is blocked on the setting screen "TV Parental Guidelines"

When the volume up key (VOL.+key) is pushed, the remote controller enters a mode for selecting a rating. When the menu key (MENU key) is pushed after such a rating that a program having the rating is to be inhibited from being viewed is selected by the channel up key (CH▲key) or the channel down key (CH▼key), therefore, the character "U" beside the rating is changed into "B" (block). Accordingly, the rating is blocked, that is, the rating is set as such a rating that a program having the rating is to be inhibited from being viewed. For example, when the menu key (MENU key) is pushed after the rating "TVMA" is selected, the character "U" beside the rating "TVMA" is changed into "B", as shown in FIG. 7.

Out of "TVMA", "TV14", "TVPG", "TV-G", "TVY7", and "TV-Y", "TVMA", "TV14", "TVPG", and "TV-G" are taken as a first group, and "TVY7" and "TV-Y" are taken as a second group. In this case, when a low-order rating in each of the groups is blocked, a rating which is higher in order than the rating in the group is also automatically blocked.

Figure 8:
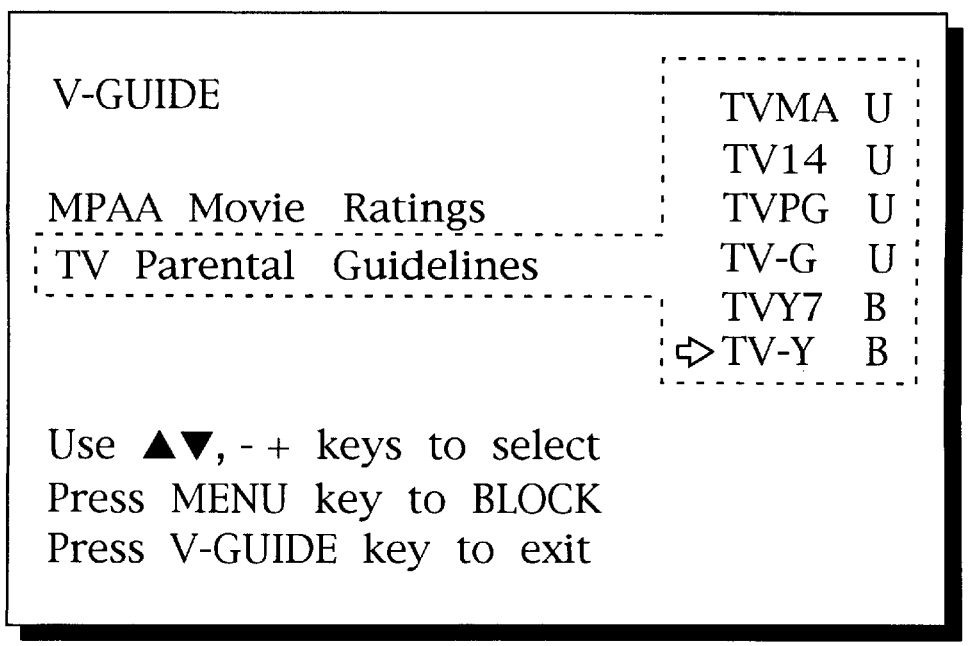
FIG. 8 is a schematic view showing that when a rating "TV-Y" in a second group is blocked on the setting screen "TV Parental Guidelines", a rating "TVY7" which is higher in order than the rating "TV-Y" in the second group is also automatically blocked.

When the rating "TV-Y" in the second group is blocked, for example, therefore, the rating "TVY7" which is higher in order than the rating "TV-Y" in the second group is also automatically blocked, as shown in FIG. 8.

In order to release, with respect to the rating which has been blocked, the blocking of the rating, the menu key (MENU key) may be pushed after the rating is selected. When a high-order rating in each of the groups is unblocked, a rating which is lower in order than the rating in the group is automatically unblocked.

When the volume down key (VOL.-key) is pushed, the remote controller leaves the mode for selecting a rating. When the V guide key (V-GUIDE key) is pushed, the menu screen is erased.

[2] Description of a Method of Releasing a Viewing Inhibiting Function (Channel Blocking) Based on the Contents of a Set Rating When a person who has set a rating such that a program having the rating is inhibited from being viewed desires to temporarily release viewing restriction (channel blocking) based on the contents of the set rating, the viewing restriction may be made invalid by pushing the V guide key (V-GUIDE key) to display the menu screen shown in FIG. 1, selecting the item "V-GUIDE", and then pushing the volume down key (VOL.-key). Even when the viewing restriction is made invalid, the set contents of the rating are held.

[3] Description of Operations in a Case Where a power-off Command is Entered

Figure 9:
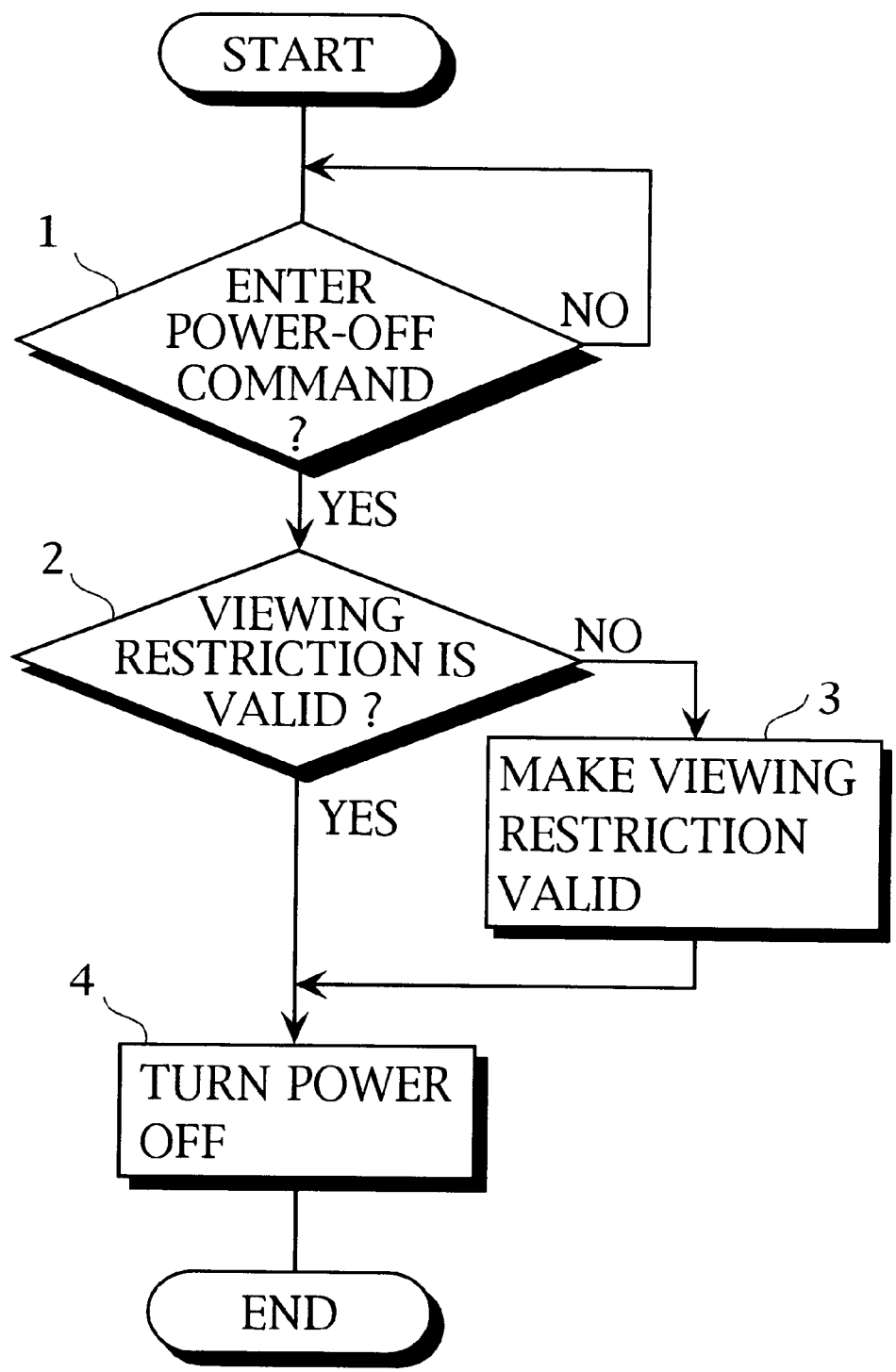
FIG. 9 is a flow chart showing the operation of a television receiver in a case where a power-off command is entered on the basis of a power-off operation.

FIG. 9 shows the operations of a television receiver in a case where a power-off command is entered on the basis of a power-off operation.

When the power-off command is entered (step 1), it is examined whether the viewing restriction is valid or invalid (step 2). When the viewing restriction is valid, the power of the television receiver is turned off (step 4).

When the viewing restriction is invalid, the viewing restriction is forced to be made valid (step 3), and the power of the television receiver is then turned off (step 4).

As described in the foregoing, in the television receiver employing a V chip function according to the present embodiment, when a person who has set a rating such that a program having the rating is inhibited from being viewed desires to temporarily release viewing restriction based on the contents of the set rating, the viewing restriction may be made invalid by performing the above-mentioned operations in the item [2]. Consequently, the viewing restriction based on the contents of the set rating can be temporarily released without changing the contents of the set rating.

Thereafter, when the person who has set a rating such that a program having the rating is inhibited from being viewed turns the power off, the viewing restriction based on the contents of the set rating before releasing the viewing restriction is automatically made valid, so that an operation for returning the contents of the set rating to the original state is simplified.

After the viewing restriction is released, it is also possible to make the viewing restriction valid (return the viewing restriction) by pushing the V guide key (V-GUIDE key) to display the menu screen, selecting the item "V-GUIDE", and then pushing the volume up key (VOL.+key).

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of temporarily releasing viewing restriction in a television receiver employing a V chip system, comprising the steps of:

causing a user to enter a viewing restriction release command without entry of a password by the user when the user desires to temporarily release viewing restriction based on the contents of a rating set such that a program having the rating is inhibited from being viewed;

making the viewing restriction based on the contents of the set rating invalid with the contents of the set rating held when the viewing restriction release command is entered;

causing the user to enter a viewing restriction return command when the user desires to return the viewing restriction; and making the viewing restriction based on the contents of the set rating valid when the viewing restriction return command is entered.

2. A method of temporarily releasing viewing restriction in a television receiver employing a V chip system, comprising the steps of:

causing a user to enter a viewing restriction release command without entry of a password by the user when the user desires to temporarily release viewing restriction based on the contents of a rating set such that a program having the setting is inhibited from being viewed;

making the viewing restriction based on the contents of the set rating invalid with the contents of the set rating held when the viewing restriction release command is entered; and making, in a case where the viewing restriction based on the contents of the set rating is invalid when a power-off command is entered, the viewing restriction based on the contents of the set rating valid, and then turning the power off.

3. A television receiver employing a V chip system, comprising:

entry means for entering a command to release viewing restriction without entry of a password by a user based on the contents of a rating set such that a program having the rating is inhibited from being viewed without changing the contents of the set rating;

means for making the viewing restriction based on the contents of the set rating invalid with the contents of the set rating held when the command to release the viewing restriction based on the contents of the set rating is entered;

entry means for entering a command to make the viewing restriction based on the contents of the set rating valid; and means for making the viewing restriction based on the contents of the set rating valid when the command to make the viewing restriction based on the contents of the set rating valid is entered after the viewing restriction is released.

4. A television receiver employing a V chip system, comprising:

entry means for entering a command to release viewing restriction without entry of a password by a user based on the contents of a rating set such that a program having the rating is inhibited from being viewed without changing the contents of the set rating;

means for making the viewing restriction based on the contents of the set rating invalid with the contents of the set rating held when the command to release the viewing restriction based on the contents of the set rating is entered; and means for making, in a case where the viewing restriction based on the contents of the set rating is invalid when a power-off command is entered, the viewing restriction based on the contents of the set rating valid, and then turning the power-off.

* * * * *